US012338358B2

(12) United States Patent
Yamasaki et al.

(10) Patent No.: US 12,338,358 B2
(45) Date of Patent: Jun. 24, 2025

(54) POLYOLEFIN-BASED COATING COMPOSITION

(71) Applicant: TOYOBO MC Corporation, Osaka (JP)

(72) Inventors: Hokuto Yamasaki, Hyogo (JP); Kenji Kashihara, Hyogo (JP)

(73) Assignee: TOYOBO MC CORPORATION, Osaka (JP)

( * ) Notice: Subject to any disclaimer, the term of this patent is extended or adjusted under 35 U.S.C. 154(b) by 661 days.

(21) Appl. No.: 17/760,921

(22) PCT Filed: Aug. 26, 2020

(86) PCT No.: PCT/JP2020/032245
§ 371 (c)(1),
(2) Date: Mar. 16, 2022

(87) PCT Pub. No.: WO2021/054068
PCT Pub. Date: Mar. 25, 2021

(65) Prior Publication Data
US 2022/0348783 A1 Nov. 3, 2022

(30) Foreign Application Priority Data
Sep. 19, 2019 (JP) ................. 2019-170662

(51) Int. Cl.
C09D 123/30 (2006.01)
C09D 5/00 (2006.01)
C09D 7/20 (2018.01)
C09D 7/65 (2018.01)

(52) U.S. Cl.
CPC ........... *C09D 123/30* (2013.01); *C09D 5/002* (2013.01); *C09D 7/20* (2018.01); *C09D 7/65* (2018.01)

(58) Field of Classification Search
CPC ..... C09D 5/002; C09D 151/06; C09D 193/04
See application file for complete search history.

(56) References Cited

U.S. PATENT DOCUMENTS

| 7,507,779 | B2 * | 3/2009 | Nagano | C09D 5/4407 524/106 |
|---|---|---|---|---|
| 2004/0266928 | A1 | 12/2004 | Yoshikawa et al. | |
| 2009/0162679 | A1 | 6/2009 | Asami et al. | |
| 2015/0050477 | A1 | 2/2015 | Komatsuzaki et al. | |
| 2016/0280828 | A1 | 9/2016 | Kawabe et al. | |
| 2017/0321093 | A1 | 11/2017 | Hirota et al. | |
| 2019/0048235 | A1 | 2/2019 | Kizumoto | |
| 2019/0382611 | A1 | 12/2019 | Yamasaki et al. | |

FOREIGN PATENT DOCUMENTS

| EP | 1 321 481 | 6/2003 |
|---|---|---|
| EP | 3 296 361 | 3/2018 |
| JP | 8-318558 | 12/1996 |
| JP | 2001-72723 | 3/2001 |
| JP | 2003-165944 | 6/2003 |
| JP | 2006-225551 | 8/2006 |
| JP | 2012-132015 | 7/2012 |
| JP | 2012-136705 | 7/2012 |
| JP | 2013-010248 | 1/2013 |
| JP | 2016-11417 | 1/2016 |
| JP | 2018-95785 | 6/2018 |
| WO | 2013/141167 | 9/2013 |
| WO | 2015/068385 | 5/2015 |
| WO | 2016/080297 | 5/2016 |
| WO | 2016/160228 | 10/2016 |
| WO | 2017/138399 | 8/2017 |
| WO | 2018/135418 | 7/2018 |
| WO | 2018/221331 | 12/2018 |
| WO | 2019/171709 | 9/2019 |

OTHER PUBLICATIONS

Technical Data Brochure: Rosin Derivatives, Arakawa USA, 23 pages (undated).*
Extended European Search Report issued Sep. 11, 2023 in corresponding European Patent Application No. 20865974.8, pp. 1-9.
International Search Report issued Nov. 2, 2020 in International (PCT) Application No. PCT/JP2020/032245.
Hongzhang et al., "Modern aluminum alloy plate and strip", 2012, Beijing Metallurgical Industry Press, with English-language translation.
Decision to Grant mailed Jul. 16, 2024 in corresponding Japanese Patent Application No. 2021-546566, with English-language Translation.
Office Action issued Aug. 18, 2022 in corresponding Chinese Patent Application No. 202080064950.4, with English translation.

* cited by examiner

Primary Examiner — Fred M Teskin
(74) Attorney, Agent, or Firm — Wenderoth, Lind & Ponack, L.L.P.

(57) ABSTRACT

The present invention provides a paint formulation that has good storage stability and weather resistance, and that is capable of forming a paint film having excellent water resistance, chemical resistance such as gasohol resistance and fuel resistance, and adhesion. The paint formulation comprises an acid-modified polyolefin (A) and a tackifier (B), and satisfies the following (a) and (b): (a) the acid-modified polyolefin (A) has crystallinity; and (b) the tackifier (B) has a double-bond equivalent of 40 or more, as defined by the formula: double-bond equivalent=weight average molecular weight/number of double bonds in a molecule, or contains no double bond.

7 Claims, No Drawings

POLYOLEFIN-BASED COATING COMPOSITION

TECHNICAL FIELD

The present invention relates to a paint formulation having good paint storage stability, adhesion to a polyolefin substrate, chemical resistance, and weather resistance.

BACKGROUND ART

In recent years, demand for chemical resistance of primer paints used for forming paint films on automobile bumpers etc. has been increasing. To satisfy such demand, various proposals have been made. In addition, high reliability is required for weather resistance when primer paints are used in harsh environments, such as outdoors, for a long period of time.

PTL 1, for example, discloses a primer paint formulation using an acid-modified chlorinated polyolefin and a dispersion resin.

PTL 2 discloses an aqueous paint formulation using an acid-modified polyolefin and a coumarone resin or indene resin.

CITATION LIST

Patent Literature

PTL 1: JP2013-10248A
PTL 2: JP2006-225551A

SUMMARY OF INVENTION

Technical Problem

However, the primer paint formulation disclosed in PTL 1 uses an acid-modified chlorinated polyolefin as a primer resin component, which is environmentally problematic, and does not exhibit sufficient chemical resistance. Further, the composition disclosed in PTL 2 is an aqueous dispersion, and does not have sufficient water resistance and chemical resistance. Moreover, tackifiers having many double bonds, such as coumarone resins or indene resins, do not have sufficient weather resistance.

An object of the present invention is to provide a paint formulation that is used as a primer of a polypropylene substrate for an automobile bumper etc., and that has excellent adhesion, water resistance, and chemical resistance, such as gasohol resistance and fuel resistance, as well as good paint storage stability and weather resistance, compared to conventional bumper primers.

Solution to Problem

The present inventors conducted extensive research to solve the above problems, and consequently found that by mixing an acid-modified polyolefin having crystallinity and a specific tackifier, a paint film having excellent adhesion and chemical resistance, as well as good paint storage stability and weather resistance, can be obtained. The present invention was thus accomplished.

Specifically, the present invention includes the following.

A paint formulation comprising an acid-modified polyolefin (A) and a tackifier (B), and satisfying the following (a) and (b):

(a) the acid-modified polyolefin (A) has crystallinity; and
(b) the tackifier (B) has a double-bond equivalent of 40 or more, as defined by the formula: double-bond equivalent=weight average molecular weight/number of double bonds in a molecule, or contains no double bond.

The tackifier (B) is preferably contained in an amount of 25 to 400 parts by mass per 100 parts by mass of the acid-modified polyolefin (A).

The paint formulation comprises a hydrocarbon-based solvent (C), the hydrocarbon-based solvent (C) is preferably contained in an amount of 200 to 3000 parts by mass per 100 parts by mass of the acid-modified polyolefin (A), and the paint formulation preferably comprises at least one of an ester-based solvent (D1) or a ketone-based solvent (D2).

The acid-modified polyolefin (A) preferably has an acid value of 5 to 40 mgKOH/g-resin, and preferably has a weight average molecular weight of 20,000 to 180,000.

The paint formulation preferably further comprises an alcohol-based solvent (E).

A primer paint for a polyolefin substrate, comprising the paint formulation according to any one of the above.

Advantageous Effects of Invention

According to the present invention, a paint formulation that has good storage stability and weather resistance, and that is capable of forming a paint film having excellent water resistance, chemical resistance such as gasohol resistance and fuel resistance, and adhesion can be obtained.

DESCRIPTION OF EMBODIMENTS

Embodiments of the present invention are described in detail below.

Acid-Modified Polyolefin (A)

The acid-modified polyolefin (A) used in the present invention is preferably obtained by grafting at least one of polyethylene, polypropylene, and a propylene-α-olefin copolymer with at least one of α,β-unsaturated carboxylic acid and acid anhydride thereof.

Examples of α-olefins include those having two or more carbon atoms. Specific examples include ethylene, propylene, 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonen, 1-decene, 1-undecene, and 1-dodecene. One or two or more of these α-olefins can be polymerized to obtain an α-olefin polymer or copolymer.

The propylene-α-olefin copolymer mainly comprises propylene that is copolymerized with an α-olefin. Examples of α-olefins include ethylene, 1-butene, 1-heptene, 1-octene, 4-methyl-1-pentene, vinyl acetate, and the like, which can be used singly or in a combination of two or more. Preferred among these α-olefins are ethylene and 1-butene. Although the proportion of the propylene component and the α-olefin component in the propylene-α-olefin copolymer is not limited, the amount of propylene component is preferably 50 mol % or more, and more preferably 70 mol % or more. When the amount of ethylene component in the propylene-α-olefin copolymer is 50 mol % or less, the paint formulation of the present invention shows good adhesion, chemical resistance, and paint storage stability. Further, even when the amount of ethylene component is 30 mol % or less, the paint formulation of the present invention shows sufficient adhesion, chemical resistance, and paint storage stability. An amount of ethylene component of 9 mol % or less also poses no problem.

The acid-modification of the acid-modified polyolefin (A) is preferably polymerization of an acid functional group. As the acid functional group, at least one of α,β-unsaturated carboxylic acid and a derivative thereof can be used, and the derivative of α,β-unsaturated carboxylic acid is preferably acid anhydride. Examples of at least one of α,β-unsaturated carboxylic acid and acid anhydride thereof include maleic acid, itaconic acid, citraconic acid, and acid anhydride thereof. Among these, acid anhydride is preferred, and maleic acid anhydride is more preferred. Specific examples include acid-modified polypropylene, acid-modified propylene-ethylene copolymers, acid-modified propylene-butene copolymers, acid-modified propylene-ethylene-butene copolymers, and the like. These acid-modified polyolefins can be used singly or in a combination of two or more.

The weight average molecular weight (Mw) of the acid-modified polyolefin (A) is preferably within the range of 10,000 to 200,000, more preferably 20,000 to 180,000, and even more preferably 40,000 to 160,000. When the weight average molecular weight (Mw) is 10,000 or more, good chemical resistance is obtained. In contrast, when the weight average molecular weight (Mw) is 200,000 or less, good paint storage stability is obtained.

In terms of adhesion to the polyolefin resin substrate, the acid value of the acid-modified polyolefin (A) is preferably within the range of 5 to 40 mgKOH/g-resin, and more preferably 10 to 30 mgKOH/g-resin. When the acid value is 5 mgKOH/g-resin or more, good paint storage stability is obtained. In contrast, when the acid value is 40 mgKOH/g-resin or less, excellent chemical resistance is obtained.

The acid-modified polyolefin (A) of the present invention is crystalline. Crystalline polyolefins are superior in adhesion and chemical resistance to amorphous polyolefins. Crystalline polyolefins refer to those that show a clear melting peak during heating from −100° C. to 250° C. at 20° C./min using a differential scanning calorimeter (DSC).

The melting point (Tm) of the acid-modified polyolefin (A) is preferably 40° C. or more, more preferably 50° C. or more, and even more preferably 60° C. or more. When the melting point is 40° C. or more, good adhesion and chemical resistance are obtained. The melting point is preferably 120° C. or less, more preferably 100° C. or less, and even more preferably 90° C. or less. When the melting point is 120° C. or less, good paint storage stability is obtained.

The heat enthalpy (ΔH) of the acid-modified polyolefin (A) is preferably 5 J/g or more, and more preferably 10 J/g or more. When the heat enthalpy (ΔH) is 5 J/g or more, good adhesion and chemical resistance are obtained. The heat enthalpy (ΔH) is preferably 60 J/g or less, and more preferably 50 J/g or less. When the heat enthalpy (ΔH) is 60 J/g or less, good paint storage stability is obtained.

It is preferable that the acid-modified polyolefin (A) is substantially not chlorinated. A substantially chlorinated acid-modified polyolefin (A) is environmentally problematic and may reduce chemical resistance. The expression "substantially not chlorinated" means that the chlorine content is preferably 5 wt % or less, more preferably 3 wt % or less, even more preferably 1 wt % or less, and particularly preferably 0 wt %.

The method for producing the acid-modified polyolefin (A) is not particularly limited. Examples of the method include a radical grafting reaction in which a radical species is formed in a polymer serving as a main chain, and unsaturated carboxylic acid and acid anhydride are graft-polymerized using the radical species as a polymerization starting point.

Examples of radical generators include, but are not limited to, organic peroxides, such as di-tert-butyl peroxyphthalate, tert-butyl hydroperoxide, dicumyl peroxide, benzoyl peroxide, tert-butyl peroxybenzoate, tert-butyl peroxy-2-ethylhexanoate, tert-butyl peroxypivalate, methyl ethyl ketone peroxide, di-tert-butyl peroxide, and lauroyl peroxide; azonitriles, such as azobisisobutyronitrile and azobisisopropionitrile; and the like. Of these, organic peroxides are preferably used.

Tackifier (B)

The tackifier, also called a tackiness-imparting agent, is an additive added for the purpose of improving adhesive strength. General tackifiers are amorphous oligomers having a weight average molecular weight of several hundreds to several thousands, and are thermoplastic resins that are liquid or solid at room temperature. Examples include petroleum resin-based tackifiers, hydrocarbon resin-based tackifiers, rosin-based tackifiers, terpene-based tackifiers, and the like. In terms of weather resistance, hydrogenated versions of the above-mentioned tackifiers are preferred.

The double-bond equivalent of the tackifier is defined by the formula: double-bond equivalent=weight average molecular weight/number of double bonds in a molecule. Double bonds refer to unsaturated carbon bonds. Unsaturated carbon bonds in the aromatic ring count as double bonds. For example, benzene has 3 double bonds. In consideration of weather resistance, the tackifier (B) of the present invention has a double-bond equivalent of 40 or more, or contains no double bond. The double-bond equivalent is more preferably 60 or more, even more preferably 80 or more, and particularly preferably 100 or more. Because the double-bond equivalent is 100 or more, even if the composition of the present invention is applied as a paint to a substrate and exposed as a paint film to light or rain outdoors for a long period of time, the paint film tends to be less likely to discolor and particularly has good weather resistance. The upper limit is not particularly limited, but is preferably 2000 or less in terms of storage stability. Double bond-free tackifiers are particularly preferably used in terms of weather resistance. The double-bond equivalent in the molecule can be adjusted, for example, by hydrogenation reaction. The tackifier (B) may contain a hydroxyl group or a carboxylic acid group. The molecular weight in this case is measured using weight average molecular weight, and the number of double bonds in the molecule is measured by nuclear magnetic resonance spectroscopy.

The softening point of the tackifier (B) is not particularly limited. It is preferably 60° C. or more, and more preferably 70 to 170° C., from the viewpoint of applicability to desired application usage, and good blending properties, coating properties, and adhesion.

The weight average molecular weight (Mw) of the tackifier (B) is preferably 100 or more, more preferably 500 or more, and even more preferably 700 or more. Further, the weight average molecular weight (Mw) is preferably 2000 or less, more preferably 1500 or less, even more preferably 1200 or less, and particularly preferably 1000 or less. When the weight average molecular weight (Mw) is 100 or more, the paint has good adhesion. In contrast, when the weight average molecular weight (Mw) is 2000 or less, the paint tends to have good storage stability. The above range is also preferred even when the tackifier (B) does not contain a double bond.

The acid value of the tackifier (B) is not particularly limited. It is preferably 30 mgKOH/g-resin or less, and more preferably 20 mgKOH/g-resin or less. If the acid value exceeds the above value, the storage stability of the paint may be problematic. Although it is not limited thereto, the acid value is preferably 1 mgKOH/g-resin or more, and more preferably 3 mgKOH/g-resin or more, in terms of adhesion.

The hydroxy value of the tackifier (B) is not particularly limited, and it is preferably 5 mgKOH/g-resin or more, more preferably 10 mgKOH/g-resin, and even more preferably 15 mgKOH/g-resin or more. When the hydroxy value is equal to or more than the above value, the paint has good adhesion. The hydroxy value of the tackifier (B) is preferably 200 mgKOH/g-resin or less, more preferably 150 mgKOH/g-resin or less, and even more preferably 100 mgKOH/g-resin or less. When the hydroxy value is equal to or less than the above value, the paint has good storage stability.

The content of the tackifier (B) in the paint formulation of the present invention is preferably 25 parts by mass or more per 100 parts by mass of the acid-modified polyolefin (A). The content of the tackifier (B) is preferably 30 parts by mass or more, more preferably 60 parts by mass or more, and even more preferably 100 parts by mass or more. When the content of the tackifier (B) is 25 parts by mass or more, the paint has good storage stability. The content of the tackifier (B) is preferably 450 parts by mass or less, more preferably 350 parts by mass or less, even more preferably 300 parts by mass or less, and particularly preferably 200 parts by mass or less. When the content of the tackifier (B) is 400 parts by mass or less, good adhesion and chemical resistance are attained.

The paint formulation of the present invention may contain a pigment. Examples of pigments include titanium oxide, calcium carbonate, barium sulfate, talc, carbon black, and the like. Such pigments can be used singly or in a combination of two or more. The total amount of the pigment is preferably 50 to 500 parts by mass, and more preferably 75 to 350 parts by mass, per 100 parts by mass of the acid-modified polyolefin (A).

In the present invention, the paint formulation contains a hydrocarbon-based solvent (C), and may further contain at least one of an ester-based solvent (D1) or a ketone-based solvent (D2). The hydrocarbon-based solvent (C) is preferably contained in an amount of 200 parts by mass or more, more preferably 300 parts by mass or more, and even more preferably 400 parts by mass or more, per 100 parts by mass of the acid-modified polyolefin (A). The amount of the hydrocarbon-based solvent (C) is preferably 3000 parts by mass or less, more preferably 2500 parts by mass or less, and even more preferably 1800 parts by mass or less. When the amount of the hydrocarbon-based solvent (C) is in the above range, excellent paint storage stability can be attained.

Examples of the hydrocarbon-based solvent (C) include aromatic hydrocarbon-based solvents, such as toluene, xylene, and Solvesso (registered trademark) 100; aliphatic hydrocarbon-based solvents, such as hexane and heptane; and alicyclic hydrocarbon-based solvents, such as cyclohexane, cyclohexene, methylcyclohexane, and ethylcyclohexane. One or more of these solvents can be preferably used. Of these, xylene or cyclohexane is preferred. In particular, a combination of xylene, Solvesso (registered trademark) 100, and cyclohexane is preferred.

The total amount of the ester-based solvent (D1) and ketone-based solvent (D2) is preferably 20 parts by mass or more, and more preferably 50 parts by mass or more, per 100 parts by mass of the acid-modified polyolefin (A). The total amount of the ester-based solvent (D1) and ketone-based solvent (D2) is preferably 500 parts by mass or less, more preferably 400 parts by mass or less, and even more preferably 200 parts by mass or less. When the total amount of the ester-based solvent (D1) and ketone-based solvent (D2) is within the above range, excellent paint storage stability can be attained.

Examples of the ester-based solvent (D1) include methyl acetate, ethyl acetate, propyl acetate, isopropyl acetate, butyl acetate, isobutyl acetate, amyl acetate, and the like. Preferred among these is ethyl acetate. Examples of the ketone-based solvent (D2) include acetone, methyl ethyl ketone, methyl isobutyl ketone, and methyl amyl ketone. Preferred among these is methyl ethyl ketone. It is also possible to combine two or more members selected from the ester-based solvents (D1) and the ketone-based solvents (D2).

The paint formulation may further contain an alcohol-based solvent (E). Addition of the alcohol-based solvent (E) can further improve the storage stability of the paint. The amount of the alcohol-based solvent (E) when added is preferably 5 parts by mass or more, and more preferably 10 parts by mass or more, per 100 parts by mass of the acid-modified polyolefin (A). The amount of the alcohol-based solvent (E) is preferably 70 parts by mass or less, and more preferably 50 parts by mass or less. When the amount of the alcohol-based solvent (E) is within the above range, remarkably excellent paint storage stability can be attained. Examples of the alcohol-based solvent (E) include methanol, ethanol, normal propyl alcohol, isopropyl alcohol, normal butanol, isobutanol, 2-butanol, and the like.

Solvent-Based Paint Formulation

The paint formulation of the present invention comprises the acid-modified polyolefin (A) and tackifier (B). The paint formulation of the present invention can be obtained by dilution as needed.

It is preferable that the paint formulation of the present invention is substantially a solvent-based paint formulation. Specifically, the total of the hydrocarbon-based solvent (C), ester-based solvent (D1), ketone-based solvent (D2), and alcohol-based solvent (E) is preferably 90 mass % or more, more preferably 95 mass % or more, and even more preferably 99 mass % or more, when the total amount of the solvents contained in the paint formulation is 100 mass %. There is no problem when the total of these components is 100 mass %. The paint formulation of the present invention can exhibit excellent water resistance and chemical resistance because it is substantially a solvent-based paint formulation.

The viscosity of the paint formulation when applied is not particularly limited. It is within the range of 10 to 300 mPa-sec, and more preferably within the range of 15 to 200 mPa-sec because good application workability and finish appearance are attained.

The paint formulation proposed in the present invention may contain an acrylic resin, alkyd resin, urethane resin, and the like insofar as the effect of the present invention is not impaired.

The paint formulation of the present invention is useful as a primer for a polyolefin substrate. The polyolefin substrate is preferably a polypropylene substrate.

EXAMPLES

The present invention is described in more detail below with reference to Examples. However, the present invention is not limited to the Examples.

Production Example of Acid-Modified Polyolefin (A)

Production Example 1

100 parts by mass of propylene-butene copolymer polymerized with a metallocene catalyst (propylene component: 76 mol % and 1-butene component: 24 mol %), 150 parts by mass of toluene, 9 parts by mass of maleic acid anhydride, and 4 parts by mass of di-tert-butyl peroxide were placed in a 1-L autoclave. The mixture was heated to 140° C., and then stirred for 3 hours. After cooling the resulting reaction mixture, the reaction mixture was poured into a container containing a large amount of methyl ethyl ketone, and the resin was precipitated. Then, the solution containing the resin was centrifuged to thereby separate and purify an acid-modified propylene-butene copolymer in which maleic acid anhydride was graft-polymerized, (poly)maleic acid anhydride, and low-molecular-weight substances. After drying under reduced pressure at 70° C. for 5 hours, an acid-modified propylene-butene copolymer (acid value: 14 mgKOH/g-resin, weight average molecular weight: 90,000, Tm: 70° C.) was obtained. The acid-modified polyolefin produced by this production example was referred to as A-1.

Production Example 2

An acid-modified propylene-butene copolymer (acid value: 40 mgKOH/g-resin, weight average molecular weight: 90,000, Tm: 70° C.) was obtained in the same manner as in Production Example 1, except that the amounts of maleic acid anhydride and di-tert-butyl peroxide were respectively changed to 30 parts by mass and 3 parts by mass. The acid-modified polyolefin produced by this production example was referred to as A-2.

Production Example 3

An acid-modified propylene-butene copolymer (acid value: 5 mgKOH/g-resin, weight average molecular weight: 90,000, Tm: 70° C.) was obtained in the same manner as in Production Example 1, except that the amounts of maleic acid anhydride and di-tert-butyl peroxide were respectively changed to 3 parts by mass and 7 parts by mass. The acid-modified polyolefin produced by this production example was referred to as A-3.

Production Example 4

An acid-modified propylene-butene copolymer (acid value: 14 mgKOH/g-resin, weight average molecular weight: 180,000, Tm: 70° C.) was obtained in the same manner as in Production Example 1, except that the amounts of maleic acid anhydride and di-tert-butyl peroxide were respectively changed to 12 parts by mass and 3 parts by mass. The acid-modified polyolefin produced by this production example was referred to as A-4.

Production Example 5

An acid-modified propylene-butene copolymer (acid value: 14 mgKOH/g-resin, weight average molecular weight: 20,000, Tm: 70° C.) was obtained in the same manner as in Production Example 1, except that the amounts of maleic acid anhydride and di-tert-butyl peroxide were respectively changed to 5 parts by mass and 10 parts by mass. The acid-modified polyolefin produced by this production example was referred to as A-5.

Preparation Example of Acid-Modified Polyolefin (A) Solution 100 parts by mass of A-1, 280 parts by mass of cyclohexane, and 120 parts by mass of xylene were placed in a 500-mL four-necked flask equipped with a water-cooled reflux condenser and a stirrer. The mixture was heated to 70° C. while stirring, and stirring was continued for 1 hour to thereby obtain an A-1 solution.

In the same manner as the A-1 solution, A-2 to A-5 solutions were obtained by dissolving A-2 to A-5.

Chlorinated Polyolefin 100 parts by mass of an amorphous chlorinated polyolefin (A-6) having a weight average molecular weight of 70,000 and a chlorine content of 30 wt %, 280 parts by mass of cyclohexane, and 120 parts by mass of butyl acetate were placed in a 500-ml four-necked flask equipped with a water-cooled reflux condenser and a stirrer. The mixture was heated to 70° C. while stirring, and stirring was continued for 1 hour to thereby obtain an A-6 solution.

Preparation Example of Rosin-Based Tackifier (B1-1) Solution 100 parts by mass of a rosin-based tackifier (B1-1) having a weight average molecular weight of 850, a softening point of 100° C., a hydroxy value of 23 mgKOH/g-resin, an acid value of 10 mgKOH/g-resin or less, and a double-bond equivalent of 142, 50 parts by mass of Solvesso (registered trademark) 100, and 50 parts by mass of cyclohexane were placed in a 500-ml four-necked flask equipped with a water-cooled reflux condenser and a stirrer. The mixture was stirred at room temperature for 2 hours to thereby obtain a B1-1 solution.

Preparation Example of Rosin-Based Tackifier (B1-2) Solution 100 parts by mass of a rosin-based tackifier (B1-2) having a weight average molecular weight of 980, a softening point of 120° C., a hydroxy value of 31 mgKOH/g-resin, an acid value of 12 mgKOH/g-resin or less, and a double-bond equivalent of 327, 50 parts by mass of Solvesso 100, and 50 parts by mass of cyclohexane were placed in a 500-ml four-necked flask equipped with a water-cooled reflux condenser and a stirrer. The mixture was stirred at room temperature for 2 hours to thereby obtain a B1-2 solution.

Preparation Example of Terpene-Based Tackifier (B1-3) Solution 100 parts by mass of a terpene-based tackifier (B1-3) having a weight average molecular weight of 910, a softening point of 115° C., a hydroxy value of 37 mgKOH/g-resin, an acid value of 12 mgKOH/g-resin or less, and a double-bond equivalent of 910, 50 parts by mass of Solvesso 100, and 50 parts by mass of cyclohexane were placed in a 500-ml four-necked flask equipped with a water-cooled reflux condenser and a stirrer. The mixture was stirred at room temperature for 2 hours to thereby obtain a B1-3 solution.

Preparation Example of Rosin-Based Tackifier (B1-4) Solution 100 parts by mass of a double bond-free rosin-based tackifier (B1-4) having a weight average molecular weight of 850, a softening point of 100° C., a hydroxy value of 40 mgKOH/g-resin, and an acid value of 13 mgKOH/g-resin or less, 50 parts by mass of Solvesso 100, and 50 parts by mass of cyclohexane were placed in a 500-ml four-necked flask equipped with a water-cooled reflux condenser and a stirrer. The mixture was stirred at room temperature for 2 hours to thereby obtain a B1-4 solution.

Preparation Example of Rosin-Based Tackifier (B2-1) Solution 100 parts by mass of a rosin-based tackifier (B2-1) having a weight average molecular weight of 950, a softening point of 120° C., a hydroxy value of 30 mgKOH/g-resin, an acid value of 1.0 mgKOH/g-resin or less, and a double-bond equivalent of 35, 50 parts by mass of Solvesso 100, and 50 parts by mass of cyclohexane were placed in a 500-ml four-necked flask equipped with a water-cooled reflux condenser and a stirrer. The mixture was stirred at room temperature for 2 hours to thereby obtain a B2-1 solution.

Preparation Example of Terpene-Based Tackifier (B2-2) Solution 100 parts by mass of a terpene-based tackifier (B2-2) having a weight average molecular weight of 620, a softening point of 90° C., a hydroxy value of 26 mgKOH/g-resin, an acid value of 3 mgKOH/g-resin or less, and a double-bond equivalent of 30, 50 parts by mass of Solvesso 100, and 50 parts by mass of cyclohexane were placed in a 500-ml four-necked flask equipped with a water-cooled reflux condenser and a stirrer. The mixture was stirred at room temperature for 2 hours to thereby obtain a B2-2 solution.

Analytical measurement and evaluation of the thus-obtained acid-modified polyolefins were performed in the following manner.

Measurement of Acid Value of Acid-Modified Polyolefin (A)

The acid value (mgKOH/g-resin) of the acid-modified polyolefin (A) in the present invention is a value calculated by FT-IR (produced by Shimadzu Corporation, FT-IR8200PC) from the following formula using coefficient (f) obtained from a calibration curve prepared with a chloroform solution of maleic acid anhydride (produced by Tokyo Chemical Industry Co., Ltd.), and absorbance (I) of the elastic peak (1780 cm$^{-1}$) of a carbonyl (C=O) bond of succinic anhydride in an acid-modified polyolefin solution.

Acid value (mgKOH/g-resin)=[absorbance $(I)\times(f)\times 2\times$ molecular weight of potassium hydroxide$\times 1000$ (mg)/molecular weight of succinic anhydride]

Molecular weight of succinic anhydride: 100.07
Molecular weight of potassium hydroxide: 56.11

Measurement of Acid Value of Tackifier (B)

The acid value of the tackifier (B) was measured according to JIS K 5601-2-1:1999 (ISO 3682:1993).

Measurement of Weight Average Molecular Weight (Mw) of Acid-Modified Polyolefin (A)

The weight average molecular weight of the acid-modified polyolefin (A) in the present invention is a value measured by an Alliance e2695 gel permeation chromatograph (hereinafter "GPC"; standard substance: polystyrene resin, mobile phase: tetrahydrofuran, column: Shodex KF-806+KF-803, column temperature: 40° C., flow rate: 1.0 mL/min, detector: photodiode array detector (wavelength 254 nm=ultraviolet light)) produced by Nihon Waters K.K.

Measurement of Weight Average Molecular Weight (Mw) of Tackifier (B)

The weight average molecular weight of the tackifier (B) in the present invention was determined by GPC measurement. The measurement was carried out under the following conditions. Then, the number average molecular weight (Mn) and weight average molecular weight (Mw) were determined from a calibration curve using commercially available monodispersed standard polystyrene. The value was measured using device: GPC HLC-8320 (produced by Tosoh Corporation), solvent: tetrahydrofuran, column: TSKgel G7000×1, TSKgel G4000×2, TSKgel G2000×1 (all produced by Tosoh Corporation), flow rate: 1.0 ml/min, sample: 20 mg/mL tetrahydrofuran solution at room temperature, and detector: photodiode array detector (wavelength: 254 nm=ultraviolet light).

Measurement of Melting Point

The melting point of the acid-modified polyolefin (A) in the present invention is a value measured by a differential scanning calorimeter (hereinafter "DSC," Q-2000, produced by TA Instruments Japan Inc.) from the top temperature of the melting peak when melting by heating at a rate of 20° C./min and resinification by cooling are performed, and melting by heating is again performed.

Measurement of Softening Point

The softening point of the tackifier (B) in the present invention was measured according to JIS K 2207 (1996).

Paint Formulation

Example 1

The paint formulation shown in Example 1 was produced in the following manner. 40 parts by mass of xylene and a pigment having the mass ratio shown in Table 1 were added to 500 parts by mass of the A-1 solution (A-1, 100 parts by mass), and the mixture was dispersed using a bead mill until the size evaluated by a grindometer became 10 μm or less, thus obtaining a pigment dispersion. The B-1 solution was added to the pigment dispersion (A-1, 100 parts by mass) in a manner such that the amount of B-1 was 100 parts by mass. Subsequently, the mixture was mixed with 110 parts by mass of cyclohexane and 105 parts by mass of methyl ethyl ketone, thus obtaining the paint formulation shown in Example 1.

Examples 2 to 10

The acid-modified polyolefin (A), tackifier (B), hydrocarbon-based solvent (C), ester-based solvent (D1), ketone-based solvent (D2), and alcohol-based solvent (E) were mixed in the proportion shown in Table 1. Except for the proportion, the components were mixed in the same manner as in Example 1 to obtain the paint formulations shown in Examples 2 to 10. The ester-based solvent (D1), ketone-based solvent (D2), and alcohol-based solvent (E) were added to a pigment dispersion.

Comparative Examples 1 to 3

The acid-modified polyolefin (A), tackifier (B), hydrocarbon-based solvent (C), ester-based solvent (D1), ketone-based solvent (D2), and alcohol-based solvent (E) were mixed in the proportion shown in Table 2. Except for the proportion, the components were mixed in the same manner as in Example 1 to obtain the paint formulations shown in Comparative Examples 1 to 3. The ester-based solvent (D1), ketone-based solvent (D2), and alcohol-based solvent (E) were added to a pigment dispersion.

Paint Stability

The paint stability of the paint formulations produced in the Examples and Comparative Examples was evaluated for the following items. Tables 1 and 2 show the results.

The viscosity (flow time) of the paint formulations produced in the Examples and Comparative Examples was measured by a Ford cup. The paint formulations were allowed to stand at −5° C. and 50° C. for 10 days to evaluate the appearance and viscosity of each paint formulation. The viscosity was measured by a Ford cup (No. 4, 25° C.).

Evaluation Criteria:
A: No seeding or gelation occurred. Increase in flow time (thickening) was 5 seconds or less, compared with before being left for 10 days.
B: No seeding or gelation occurred. Thickening occurred in more than 5 seconds to 10 seconds.
C: No seeding or gelation occurred. More than 10 seconds were required for thickening.
D: Seeding and gelation occurred.

Production of Test Piece 100 parts by mass of a paint formulation obtained in the Example or Comparative Example, 30 parts by mass of Solvesso 100, and 30 parts by mass of toluene were mixed to adjust the solvent composition to that when applied. Hereinbelow, the adjusted paint formulations are referred to as diluted paint formulations.

A polypropylene substrate was degreased with isopropyl alcohol to make a test sheet. The diluted paint formulation produced as above was applied by spraying to the test sheet to a dry film thickness of 10 μm. As a colored base paint, Retan (registered trademark) PG white (tradename, produced by Kansai Paint Co., Ltd.) was applied by spraying to the diluted paint formulation side of the test sheet to a dry film thickness of 50 μm. Heating was then performed in an oven at 80° C. for 30 minutes, thereby obtaining a test piece including a laminated paint film. Various paint film performance tests described below were performed on the test piece.

Paint Film Performance Test

Test pieces produced as above were evaluated for the following items. Tables 1 and 2 show the results.

(1) Initial Adhesion

Cross-cuts reaching the substrate of each test piece were made using a cutter knife to form a grid of 100 squares (1 mm×1 mm). Adhesive cellophane tape was applied to the surface of the grid portion, and the tape was peeled off rapidly at 20° C. Then, the number of squares of the paint film remaining was checked.

Evaluation Criteria:
A: 100 squares remained.
B: 99 to 90 squares remained.
C: 89 to 41 squares remained.
D: The number of squares remaining was 40 or less.

(2) Water Resistance

After each test piece was immersed in hot water at 40° C. for 10 days, the surface of the paint film was observed.

Evaluation Criteria:
A: No appearance change, and the surface of the paint film was remarkably excellent.
B: Almost no appearance change, and the surface of the paint film was excellent.
C: The paint film swelled. Abnormalities, such as blistering, were confirmed.

(3) Gasohol Resistance

Each test piece was immersed in a test solution having a weight ratio of gasoline/ethanol=90/10 at 20° C., and the coating surface conditions such as blistering and peeling after 120 minutes were observed and evaluated according to the following criteria.

Blistering with a diameter of less than 3 mm means that the maximum diameter of a blister on the coating surface is less than 3 mm.

Evaluation Criteria:
A: No abnormalities.
B: No blistering, but peeling with a diameter of a less than 3 mm occurred; blistering and peeling both with a diameter of less than 3 mm occurred; or no peeling, but blistering with a diameter of less than 3 mm occurred.
C: Blistering or peeling with a diameter of 3 mm or more occurred.

(4) Fuel Resistance

A test solution was prepared based on an alcohol-added fuel solution for test designated by ISO1817. The test solution comprises 23.35 mass % of 2,2,4-trimethylpentane, 42.25 mass % of toluene, 12.68 mass % of diisobutylene, 15.0 mass % of methanol, 4.22 mass % of ethanol, 0.5 mass % of water, and 20 ppm of formic acid. The test piece was immersed in the test solution at 25° C. for 120 minutes. Thereafter, the test piece was dried by heating in an oven at 80° C. for 30 minutes, and cross-cuts reaching the substrate of each test piece were made using a cutter knife to form a grid of 100 squares (1 mm×1 mm). Adhesive cellophane tape was applied to the surface of the grid portion, and the tape was peeled off rapidly at 20° C. Then, the number of squares of the paint film remaining was checked.

Evaluation Criteria:
A: 100 squares remained.
B: 99 to 90 squares remained.
C: 89 to 41 squares remained.
D: The number of squares remaining was 40 or less.

(5) Weather Resistance Test

The paint film of the test piece produced was subjected to an accelerated weather resistance test using a Sunshine Weather Meter (Suga Test Instruments Co., Ltd.). The test was carried out under the following conditions: irradiation temperature: 63° C.±3° C., humidity: 50±5%, sample surface irradiance: 78.5 W/m, light wavelength range: 300 to 400 nm, irradiation time: 200 hours, and rainfall conditions: raining for 12 minutes with a 60-minute cycle.

The evaluation criteria are as follows.
A: The paint film was discolored.
B: The paint film was slightly discolored.
C: The paint film was moderately discolored.
D: The paint film was significantly discolored.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Solvent-based paint formulation | Acid-modified polyolefin (A) | A-1 | 100 | 100 | 100 | 100 | | | | | 100 | 100 |
| | | A-2 | | | | | 100 | | | | | |
| | | A-3 | | | | | | 100 | | | | |
| | | A-4 | | | | | | | 100 | | | |
| | | A-5 | | | | | | | | 100 | | |
| | Tackifier (B) | B1-1 | 100 | | | | | | | | | |
| | | B1-2 | | 100 | | | | | | | | |
| | | B1-3 | | | 100 | | | | | | | |
| | | B1-4 | | | | 100 | 100 | 100 | 100 | 100 | 25 | 400 |
| | Hydrocarbon-based solvent (C) | Xylene | 160 | 160 | 160 | 160 | 160 | 160 | 160 | 160 | 100 | 400 |
| | | Cyclohexane | 440 | 440 | 440 | 440 | 440 | 440 | 440 | 440 | 280 | 1100 |
| | | Solvesso 100 | 50 | 50 | 50 | 50 | 50 | 50 | 50 | 50 | 30 | 130 |
| | Ketone-based solvent (D2) | Methyl ethyl ketone | 105 | 105 | 105 | 105 | | | | | 105 | 260 |
| | | Methyl isobutyl ketone | | | | | | 90 | | | | |
| | | Methyl amyl ketone | | | | | | | | 105 | | |
| | Ester-based solvent (D1) | Butyl acetate | | | | | | | | | 90 | |
| | | Ethyl acetate | | | | | | | 105 | | | |
| | | Amyl acetate | | | | | | | | | | 65 |
| | Alcohol-based solvent (E) | Isopropyl alcohol | | | | | 15 | | | 15 | | |
| | Pigment | Titanium oxide | 100 | 100 | 100 | 100 | 100 | 100 | 100 | 100 | 60 | 250 |
| | | Carbon black | 5 | 5 | 5 | 5 | 5 | 5 | 5 | 5 | 5 | 15 |
| | | Barium sulfate | 20 | 20 | 20 | 20 | 20 | 20 | 20 | 20 | 15 | 50 |
| | | Talc | 7.5 | 7.5 | 7.5 | 7.5 | 7.5 | 7.5 | 7.5 | 7.5 | 5 | 20 |
| Evaluation results | Paint film evaluation | Initial adhesion | A | A | A | A | A | A | A | A | A | A |
| | | Water resistance | A | A | A | A | A | A | A | A | A | A |
| | | Gasohol resistance | A | A | A | A | A | A | A | A | A | A |
| | | Fuel resistance | A | A | A | A | A | A | A | A | A | B |
| | Paint stability | −5° C. | A | A | A | A | A | A | A | A | A | A |
| | | 50° C. | A | A | B | B | B | A | B | A | B | B |
| | Weather resistance test | | B | A | A | A | A | A | A | A | A | A |

TABLE 2

| | | | Comp. Ex. 1 | Comp. Ex. 2 | Comp. Ex. 3 |
|---|---|---|---|---|---|
| Solvent-based paint formulation | Acid-modified polyolefin (A) | A-1 | 100 | 100 | |
| | Chlorinated polyolefin | A-6 | | | 100 |
| | Tackifier (B) | B1-1 | | | 100 |
| | | B2-1 | 100 | | |
| | | B2-2 | | 100 | |
| | Hydrocarbon-based solvent (C) | Xylene | 160 | 160 | 160 |
| | | Cyclohexane | 440 | 440 | 440 |
| | | Solvesso 100 | 50 | 50 | 50 |
| | Ketone-based solvent (D2) | Methyl ethyl ketone | 105 | 105 | |
| | Ester-based solvent (D1) | Butyl acetate | | | 90 |
| | Alcohol-based solvent (E) | Isopropyl alcohol | | | 15 |
| | Pigment | Titanium oxide | 100 | 100 | 100 |
| | | Carbon black | 5 | 5 | 5 |
| | | Barium sulfate | 20 | 20 | 20 |
| | | Talc | 7.5 | 7.5 | 7.5 |
| Evaluation results | Paint film evaluation | Initial adhesion | A | A | A |
| | | Water resistance | A | A | A |
| | | Gasohol resistance | A | A | A |
| | | Fuel resistance | A | A | D |
| | Paint stability | −5° C. | B | B | A |
| | | 50° C. | B | B | B |
| | Weather resistance test | | D | D | B |

INDUSTRIAL APPLICABILITY

The paint formulation of the present invention can form a paint film having excellent water resistance and chemical resistance such as gasohol resistance and fuel resistance because it contains an acid-modified polyolefin and a specific tackifier. Accordingly, the paint formulation of the present invention is useful as a primer of a polypropylene substrate used for an automobile bumper etc.

The invention claimed is:

1. A paint formulation comprising an acid-modified polyolefin (A) and a tackifier (B), and satisfying the following (a) and (b):
   (a) the acid-modified polyolefin (A) has crystallinity; and
   (b) the tackifier (B) has a double-bond equivalent of 40 or more, as defined by the formula: double-bond equivalent=weight average molecular weight/number of double bonds in a molecule, or contains no double bond,
   wherein the paint formulation comprises the tackifier (B) in an amount of 60 to 400 parts by mass per 100 parts by mass of the acid-modified polyolefin (A).

2. The paint formulation according to claim 1, wherein the paint formulation further comprises a hydrocarbon-based solvent (C) in an amount of 200 to 3000 parts by mass per 100 parts by mass of the acid-modified polyolefin (A).

3. The paint formulation according to claim 1, further comprising at least one solvent selected from the group consisting of an ester-based solvent (D1) and a ketone-based solvent (D2).

4. The paint formulation according to claim 1, wherein the acid-modified polyolefin (A) has an acid value of 5 to 40 mgKOH/g-resin.

5. The paint formulation according to claim 1, wherein the acid-modified polyolefin (A) has a weight average molecular weight of 10,000 to 200,000.

6. The paint formulation according to claim 1, further comprising an alcohol-based solvent (E).

7. A primer paint for a polyolefin substrate, comprising the paint formulation according to claim 1.

* * * * *